US012630433B2

(12) United States Patent
Fairchild et al.

(10) Patent No.: US 12,630,433 B2
(45) Date of Patent: May 19, 2026

(54) PRODUCTION OF SILICATE SOLUTIONS AND THEIR USES

(71) Applicant: Total Alchemy Solutions, LLC, Cypress, TX (US)

(72) Inventors: Paul W. Fairchild, Spring, TX (US); Scott Blue, Cypress, TX (US)

(73) Assignee: Total Alchemy Solutions, LLC, Cypress, TX (US)

( * ) Notice: Subject to any disclaimer, the term of this patent is extended or adjusted under 35 U.S.C. 154(b) by 286 days.

(21) Appl. No.: 18/069,304

(22) Filed: Dec. 21, 2022

(65) Prior Publication Data

US 2024/0228305 A1 Jul. 11, 2024

(51) Int. Cl.

| | |
|---|---|
| ***C01B 33/32*** | (2006.01) |
| ***A01N 59/00*** | (2006.01) |
| ***A01P 3/00*** | (2006.01) |
| ***B01J 23/04*** | (2006.01) |
| ***B01J 35/27*** | (2024.01) |
| ***B01J 37/04*** | (2006.01) |
| ***B27K 3/16*** | (2006.01) |
| ***C02F 1/52*** | (2023.01) |
| ***C10L 1/02*** | (2006.01) |
| ***C11B 3/02*** | (2006.01) |
| ***C14C 1/06*** | (2006.01) |
| *C02F 101/10* | (2006.01) |
| *C02F 101/16* | (2006.01) |
| *C02F 101/20* | (2006.01) |
| *C02F 101/22* | (2006.01) |

(52) U.S. Cl.

CPC .............. *C01B 33/32* (2013.01); *A01N 59/00* (2013.01); *A01P 3/00* (2021.08); *B01J 23/04* (2013.01); *B01J 35/27* (2024.01); *B01J 37/04* (2013.01); *B27K 3/16* (2013.01); *C02F 1/5236* (2013.01); *C10L 1/02* (2013.01); *C11B 3/02* (2013.01); *C14C 1/06* (2013.01); *B27K 2240/20* (2013.01); *C02F 2101/103* (2013.01); *C02F 2101/106* (2013.01); *C02F 2101/16* (2013.01); *C02F 2101/203* (2013.01); *C02F 2101/22* (2013.01); *C10L 2200/0476* (2013.01)

(58) Field of Classification Search

CPC .. C01B 33/32; B01J 35/27; B01J 23/04; B01J 37/04

USPC .......................................................... 423/335

See application file for complete search history.

(56) References Cited

U.S. PATENT DOCUMENTS

| | | | | |
|---|---|---|---|---|
| 2,083,545 A | | 6/1937 | Burkhart | |
| 2,153,872 A | | 4/1939 | McDaniel | |
| 2,239,880 A | | 4/1941 | Curll, Jr. | |
| 2,374,035 A | | 4/1945 | Nutting, Jr. | |
| 2,826,482 A | | 3/1958 | Laymon | |
| 2,829,030 A | | 4/1958 | Habernickel | |
| 2,840,456 A | | 6/1958 | Gooding | |
| 2,970,038 A | | 1/1961 | Hyde | |
| 4,367,073 A | | 1/1983 | Just | |
| 4,498,921 A | * | 2/1985 | Wojtowicz | C02F 1/76 210/764 |
| 4,770,866 A | * | 9/1988 | Christophliemk | B01J 3/04 423/334 |
| 5,145,816 A | | 9/1992 | Beck | |
| 5,215,732 A | * | 6/1993 | Hachgenei | C01B 33/32 423/334 |
| 5,648,314 A | | 7/1997 | Lachocki | |
| 7,629,004 B2 | | 12/2009 | Aragat | |
| 9,980,489 B2 | | 5/2018 | Roose | |
| 2020/0231454 A1 | * | 7/2020 | Otterstedt | C01B 33/325 |
| 2022/0411275 A1 | * | 12/2022 | Matsubara | C09C 1/3081 |

FOREIGN PATENT DOCUMENTS

| | | | |
|---|---|---|---|
| CN | 1046508 | | 10/1990 |
| CN | 105236434 | | 1/2016 |
| CN | 205061574 | | 2/2016 |
| CN | 114380298 | | 4/2022 |
| CN | 114380298 A | * | 4/2022 |
| EP | 164073 | | 11/1985 |
| WO | WO93/04582 | | 3/1993 |

OTHER PUBLICATIONS

Pipathworapoom, W., et al. "Rapid synthesis of sodium silicate through adiabatic reaction with low emission starting from exhausted KL-Si" Sep. 2022. Journal of Cleaner Production, 376, 134298 (Year: 2022).*

English Translation CN-114380298-A Jin Long (Year: 2022).*

* cited by examiner

*Primary Examiner* — Sahana S Kaup

*Assistant Examiner* — Toriana N. Vigil

(74) *Attorney, Agent, or Firm* — Emerson, Thomson & Bennett, LLC; Roger D. Emerson; Peter R. Detorre

(57) ABSTRACT

An aqueous orthosilicate solution comprising m[$SiO4^{4-}$]+ $nX^{1+}$ in an aqueous solution wherein X is an alkali metal cation selected from the group consisting of sodium or potassium; and wherein n is four to five times greater than m. The aqueous orthosilicate solution is made by adding silicon particles of less than about 3 cm and water to a pressure vessel followed by adding a molar excess of alkali caustic to the pressure vessel containing the silicon particles. The temperature in the vessel is maintained not to exceed about 190° F. while an aqueous orthosilicate solution is formed. Upon cooling the formed aqueous orthosilicate solution is recovery. Aluminum or CuO can be added during the initial heating.

8 Claims, 3 Drawing Sheets

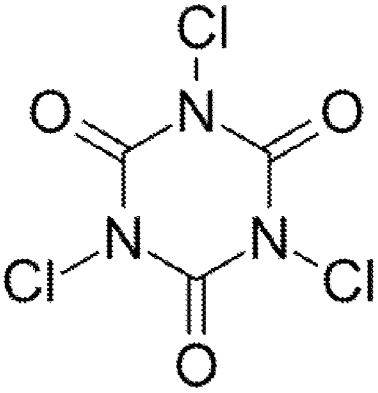
FIG. 1
FIG. 7
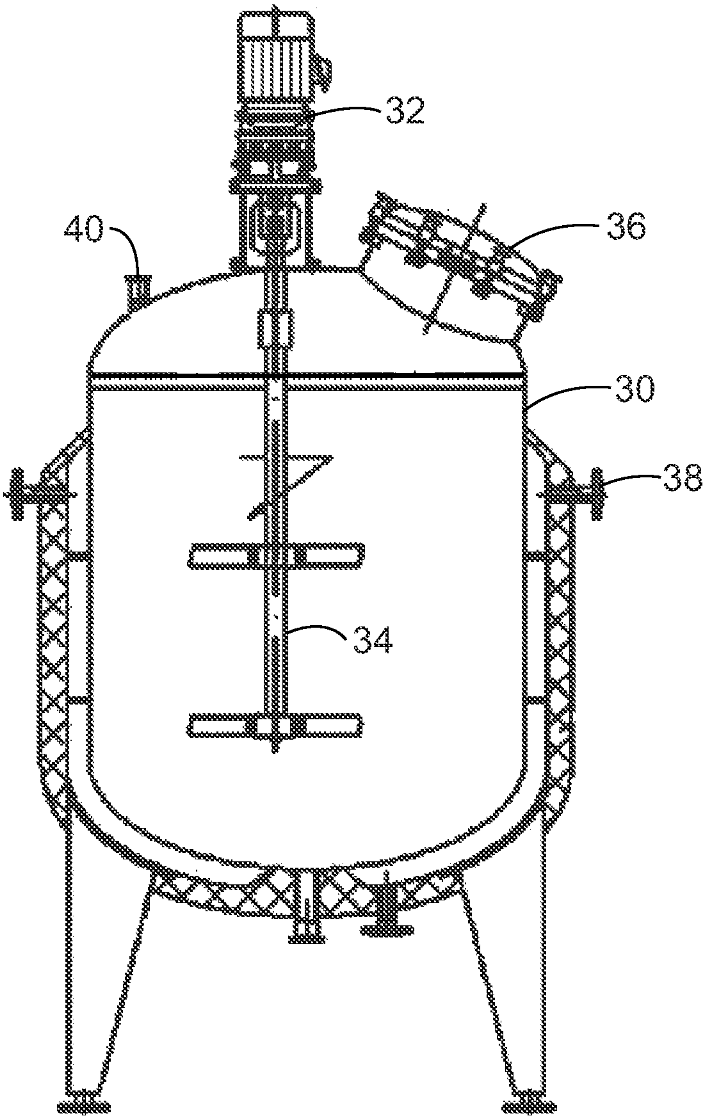

| | BASF 7500.5oz | TAS - 117.5oz | TAS - 13.5oz | TAS - 13.3oz | TAS - 13.1oz |
|---|---|---|---|---|---|
| 24 hr | 2855 | 2625 | 2685 | 2580 | 2574 |
| 7 day | 5715 | 6045 | 5920 | 5965 | 6310 |
| 28 day | 7035 | 7655 | 7635 | 7640 | 7485 |
| set time | 4.58 | 3.25 | 3.25 | 3.25 | 3.25 |
| workability | 4.5 | 3.5 | 3.5 | 3.25 | 3.5 |

PRODUCTION OF SILICATE SOLUTIONS AND THEIR USES

CROSS-REFERENCE TO RELATED APPLICATIONS

None.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

The present disclosure relates to the manufacture and use of water-soluble silicate solutions and more particularly to alkali metal silicate solutions (orthosilicates), their production, and their uses.

Silicate solutions have a generalized form ($X_2O{\cdot}nSiO_2$), where the alkali metal, X, typically is either sodium or potassium. They are characterized by the ratio of alkali X to silicon ($SiO_2/X_2O$). These various silicates are widely used in various industrial applications. For instance, in water treatment where it promotes floc formation and removal of certain heavy metals and is an excellent de-emulsifier, [1] Coagulation-Flocculation processes in Water/Wastewater Treatment: "The Application of New Generation of Chemical Reagents," N. D. Tzoupanos and A. I Zouboulis, 6$^{th}$ IASME Int. Conf. on Heat Transfer, Rhodes, Greece, Aug. 20-22, 2008; [2] "Sodium Silicate, A Binder for the 21$^{st}$ Century," M. McDonald and J. LaRosa, The PQ Corporation, Industrial Chemicals Div. Brochure]. It is well known that these silicate solutions have a complex molecular structure, see e.g., [Soluble Silicates, SIDS Initial Assessment Report for SIAM 18, Paris, France 20-23 2004] and the exact nature of the structure is dependent on pH and despite much research the exact molecular configuration of these solutions is unclear.

The focus of this invention is on the production of sodium-based silicates with sodium hydroxide (NaOH), however the use of potassium hydroxide (KOH) is just as acceptable. It is well known that, when adding sodium hydroxide (NaOH) to a soluble silicate, the ratio (molar or weight) increases, the pH increases, and the $SiO_2/Na_2O$ ratio decreases. It is this ratio that is key in determining the physical and chemical properties of the solution [Sodium and Potassium Silicates, Versatile Compounds for your Applications, PQ Europe brochure]. For instance, a previous study [The Viscosity Properties of Sodium Silicate Solutions, X. Yang, W. Zhu and Q. Tang, J. Solution Chem. 37(1), 73-83, 2008] on water glass showed that the viscosity is highly dependent on the modulus and increases as the solution becomes either higher in silicate monomer concentration or higher in pH, i.e., at both higher and lower $SiO_2/Na_2O$ molar ratios. The viscosity of this complex silicate system is given by the silicate conformation i.e., the degree of polymerization. It also has been proposed that increasing or decreasing the moduli from the minimum value of the viscosity, resulted in either larger or smaller aggregates of silicate anions.

Typically, silicates solutions have been produced through the following reaction:

$$SiO_2 + NaOH + Heat = SiO_3.$$

Manufacture has generally been carried out in large open-hearth furnaces above 1300° C. by the following reactions. Except under unusual circumstances, the reaction using soda "ash" is always employed, the manufacture of soluble silicates was reviewed by Williams (2). Improvements in reaction furnaces have been proposed. Burke (3) discloses coating sand particles with a mixture of sodium silicate and NaOH to give a $SiO_2$:$Na_2O$ ratio of 2.5:1 to 4:1 and heating the particles in suspension in a flame to more than 3500° F., at which temperature uniform particles of soluble glass are formed. Other proposals are a cyclone type furnace (4), a vertical column furnace in which reactants pass downward into a heated reactor and the product moves upward around the column as a heat exchanger (5), and a submerged combustion furnace in which a 70 C reduction in fuel cost and 80% reduction in size can be realized (6) ~Quantitative data on the rate of dissolution of sand (quartz) in molten $Na_2CO_3$ or $SiO_2$—$Na_2O$ glass have become available. Terai, Sugac. and Hayarni (7) found that at atmospheric pressure the reaction product at the $SiO_2$-molten $Na_2CO_3$ boundary is metasilicate, whereas under vacuum the reaction rate is slower and metasilicate is not detected.

Presently the method of production of soluble silicates involves combining soda ash ($Na_2CO_3$) with pure sand ($SiO_2$) and heating in a furnace to temperatures over 1000 C. The resultant product is a glass-like material that is ground and then NaOH (KOH would work equally as well) is added to create various metasilicates. This is a costly and time intensive process.

The present disclosure provides a new and improved method of production of the silicates of interest and experimental evidence of their use, for example, in controlling mold.

BRIEF SUMMARY OF THE INVENTION

A nesosilicate fluid comprises $m[SiO_4^{4-}]+nX^{1+}$ in an aqueous solution wherein X is an alkali metal cation selected from the group consisting of lithium, sodium, potassium, rubidium, and cesium; and wherein n is four to five times greater than m. In aspects described herein concerning the aforementioned nesosilicate fluid, the fluid is derived from an aqueous solution comprising m[Si] and n[XOH]. The stoichiometry for the reaction is 1 mole of silicon to 4 moles of NaOH. A slight excess is preferred to ensure that all of the silicon is consumed.

The disclosure further contemplates orthosilicate solutions combined with trichloro-s-triazinetrione: combining orthosilicate solution comprising $m[SiO_4^{4-}]+nX^{1+}$ in an aqueous solution wherein X is an alkali metal cation selected from the group consisting of sodium, or potassium; and wherein n is four "to five" times greater than m, with the intent of creating a disinfecting solution that can provide a protective barrier. An advantageous trichloro-s-triazinetrione is 1,3,5 trichloro 2,4,6 triazinetrione also known as trichloro-s-triazinetrione or Trichloroisocyanuric acid whose structure is shown in FIG. 1.

In another aspect, a method for treating and killing mold and mildew:

combining a first fluid comprising water and a comprising $m[SiO_4^{4-}]+nX^{1+}$ in an aqueous solution wherein X is an alkali metal cation selected from the group consisting of sodium or potassium; and wherein n is four to five times greater than m, with a second chemical comprising of a chlorine generating species, e.g., trichloro-s-triazinetrione; and generating a mist or fine spray of the nesosilicate fluid and the trichloro-s-triazinetrione, which will kill mold and mildew. It is also anticipated that the chlorine activated compound also will be effective on bacteria and viruses, including MRSA.

A key part of the process is the Si metal, which is added in two types, (1) 0-10% rock with sizes ranging up to 2-3 centimeters and (2) 90-100% fine Si powder with sizes 100 mesh to a few millimeters. It should be understood, however, that 100% rock or 100% powder will work in accordance with the principles disclosed herein. The greater the percentage of small Si particles the faster the reaction commences and the temperature spikes very quickly. In order to moderate and control the rise of temperature, the Si powder and water are combined first and then the caustic is added slowly, generally 5-10% of the total weight amount per 1-5 minutes. The rate is generally slower at the beginning, then as the total amount of caustic increases the addition rate can increase. With the slow addition of the base, especially with the liquid caustic, the rapid temperature spike is avoided. So, to ensure complete reaction, all the silicon reacted, the temperature of the reaction vessel is kept at 160-190 F. Mild agitation also may be used to ensure the mixture is well mixed. The type of vessel can be almost any shape and size; however, materials, such as, for example, aluminum or brass should be avoided due to the high alkalinity. Stainless steel can be used.

Not all embodiments must perform each of these steps and some embodiments may omit one or more steps. For example, some embodiments may use different chlorinated compounds. Other embodiments may use slightly higher NaOH (or KOH) to Si mole ratios than the preferred 4:1. Ratios as high as 5:1 can be used for cases where excess NaOH (or KOH) is not of concern.

The aforementioned method compromises different reaction temperatures. Orthosilicates can be produced with the specified reaction with no added external heat, using only the heat generated by the exothermic reaction. In these cases, the orthosilicate produced is equally as good; however, without added heat the Si is not completely consumed. On occasion higher than atmospheric pressure can be used.

In summary, orthosilicate is produced from Si metal and NaOH. A theoretical $SiO_2/Na_2O$ ratio is 1:2 and the temperature is kept below 90 C. Also, the orthosilicate produced is in the liquid form.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which:

FIG. 1 is the chemical structure of 1,3,5 trichloro 2,4,6 triazinetrione also known as trichloro-s-triazinetrione or trichloroisocyanuric acid;

FIG. 7 is a schematic of the pressure vessel used to make the orthosilicate in the working examples.

Figure 2:
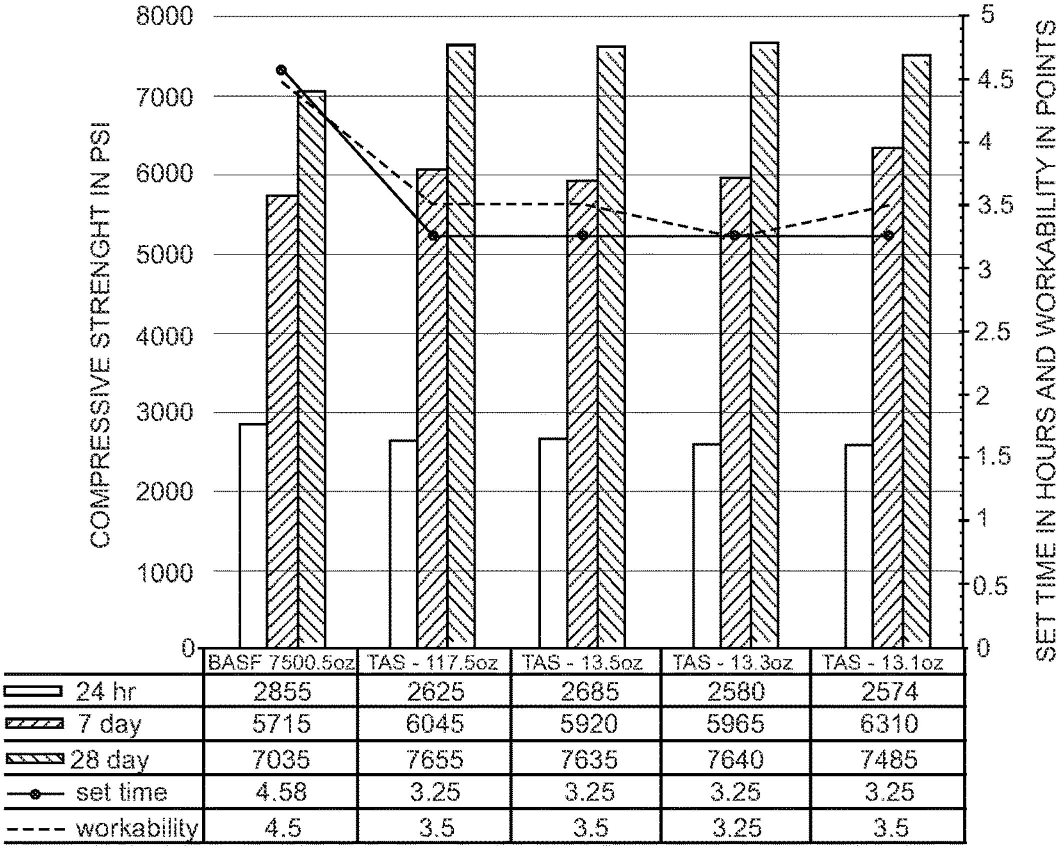
FIG. 2 displays the data recorded illustrating the increase in tensile strength of cement by 2-3 times.

The drawings will be described in greater detail below.

DETAILED DESCRIPTION OF THE INVENTION

In the present invention, an orthosilicate is produced according to an exothermic reaction of Si metal and NaOH in the following ratio:

$$Si(s) + 4\,NaOH(s) + xH_2O = SiO^{4-} + 4Na^{1+} + xH_2O$$

This reaction is exothermic with $$\Delta H_f^o(liq) = -1511\ kJ/\text{mol}$$

[NIST Chemistry Web Book] and produces significant heat. The important aspect of this invention is the control of the heat, the pressure, and the amount of water used. In order to control these variables, the reaction advantageously takes place in a controlled and closed vessel. As the temperature rises, water vapor evaporates, and the pressure is allowed to rise. The reaction often is at a temperature of 160-200 F (71-93 C) and the pressure is kept below 40 psi through the use of a mechanical bleed-off valve or a similar device. In some reactions the pressure is kept at atmospheric pressure. The appropriate amount of Si metal is added to the vessel along with water. The sodium hydroxide then is quickly added, and the vessel sealed. Sodium hydroxide (or potassium hydroxide) can be in either the solid form or as a liquid.

During the production of the orthosilicates, the temperature, pressure, and pH are controlled to maintain the $SiO_2/Na_2O$ ratio of less than 1. At this ratio, the monomer $SiO_4^{4-}$ is 50-60% of the resultant orthosilicate solution and other silicate species also are formed. While the present process seeks to minimize the $SiO_2/Na_2O$ ratio and maximize $SiO_4^{4-}$ production, other silicates species also may be present, such as, for example, dimers and trimers of the form $[SiO_3^{2-}]_n$, where n=1, 2, and 3. The other silicates which are present are not thought to be as effective as $SiO_4^{4-}$; however, such other species will still serve to some degree as a hydrogen bonding disrupters and/or de-emulsifiers and, as such, are included herein.

The orthosilicate is manufactured based on the following stoichiometry:

$$Si(s) + 4NaOH(s) + H_2O = SiO_4^{4-} + 4Na^{1+} + H2O$$

The silicon metal (Si) and dry anhydrous sodium hydroxide (NaOH) are weighed to match the above stoichiometry. The mole ratio of sodium hydroxide may vary between 4 and 5 and is dependent on the hardness of the water. Hardness in the form of $Ca^{2+}$ and $Mg^{2+}$ ions reduces the effective $OH^-$ concentration as a result of precipitation as a hydroxide. Since OH concentration has a direct effect on pH and effectively increases the $SiO_2/Na_2O$ ratio lowering $SiO_4^{4-}$, an excess NaOH may be added under these conditions. Once the proper amount of silicon metal, sodium hydroxide, and water are determined, the mixture is carefully added to a pressure vessel and the pressure lid closed. The reaction is strongly exothermic, and the temperature quickly rises to between about 180-225 F. The lid must be closed to prevent loss of water vapor, but this increases the pressure. The reaction vessel is fitted with a pressure relief valve or equivalent and is set to maintain the pressure within the reaction vessel to under about 50 psi. The pressure within the vessel is dependent on the volume of reactants and the internal volume, so careful planning is advised. The reaction is complete when the silicon metal is completely consumed, i.e., no visible pieces are evident. The reaction generally takes several hours.

A measure of the quality of the orthosilicate solution produced is determined by testing both the pH and specific gravity. For a proper solution the pH often will be 13 or greater and the specific gravity often will be greater than 1.3.

After the orthosilicate is confirmed, it is filtered via a filter capable of removing particles above 10 microns (removing even smaller particles, above 1 micron would be better, but it is very time consuming and the particles between 1-10 microns do not seem to affect the results). The solution, then is stored as a pure solution or it may be diluted with an equal volume of water and stored as a 50/50 mixture.

In the present disclosure, for illustrative purposes, sodium hydroxide is used which results in the orthosilicate associated to a cationic sodium. In certain applications, other alkali metals, such as, for example, potassium, could be used in the formation of a hydroxide base. Still further in other applications, hydroxide bases of the alkali earth metals, such as, for example, beryllium, magnesium, calcium, strontium, or barium are contemplated.

Soluble silicates, ortho and metasilicates, have been shown to possess a unique quality of forming protective barriers on porous surfaces, such as, for example, wood. The presence of the chlorinated compounds added to the orthosilicates, then, can kill the mold and mildew and the protective barrier provides a long-lasting barrier preventing future mold and mildew reconstitution, including bacterial, viruses and MRSA in general.

The use of soluble orthosilicates that contain a chlorinated compound has been shown to be effective in the treatment of mold and mildew that results from water damage. When the orthosilicates are combined trichloro-s-triazinetrione, for example, a chemical typically used in chlorinated pool chemicals, it can kill mold and mildew, as well as most bacteria and viruses, and then provide a silicate barrier on the surface further reducing the ability of these to return.

Mold is a naturally occurring fungal material. The best way to control mold is to limit its formation by limiting moisture. Prevention always is preferred but, in many cases, it cannot be prevented, for example, after a significant water leak or after severe storm damage. Chlorinated orthosilicates were developed to treat such mold.

The chlorinated orthosilicates act as a biocide that has a unique ability to kill mold. It is essentially a liquid-glass-based material in a solution that has a relatively high pH (pH>12) and has the ability to coat surfaces with a hard silicate barrier that seeps into small cracks and fissures on the surface forming an impenetrable barrier and encapsulating the mold spores. This barrier locks out moisture and oxygen which are necessary for mold and mildew growth. In addition, chlorinated orthosilicates coat surfaces to prevent further mold and mildew growth. By eliminating two of the four ideal environmental conditions mold and mildew require to survive, food source and oxygen, mold and mildew cannot survive. The key to the silicates' success lies in its molecular formula which is based on a silicate monomer that has a very high electron potential when compared to other additives including other commercially available silicates. This large potential gives orthosilicates improved bonding properties over other commercial additives, allowing them to form a stronger barrier on the surface compared to other commercial additives. The silicate barrier prevents mold and mildew from returning. Often, buildings inundated with mold and mildew have a distinct "musty" odor. In addition, there may be decaying organic matter left behind, especially after natural disasters. Decaying organic matter leaves an awful, unrelenting, rotting smell behind well after cleanup. That rotting smell is often due to a class of compounds called amines which result from decaying proteins. Chlorinated orthosilicates have been shown to eliminate both the "musty" odors left behind by mold and mildew and the rot-odor left behind by decaying organic matter. The molecular formula of the orthosilicate is unique in that it forms a strong barrier to any contaminated surface which does not allow any odor from those surfaces to leak through. This is the same mechanism which makes the orthosilicate an effective solution to prevent mold and mildew from returning to such treated surfaces. The orthosilicate solution has been thoroughly tested and shown to reduced 100% black mold in water damaged structures and has been demonstrated to eliminate decayed fish odors from contaminated refrigerators. In both cases the mold, mildew, and odor were fully eliminated in less than an hour.

As mentioned above, the disclosed alkali metal orthosilicates find uses in a wide variety of other industries. These will be discussed below.

PREFERRED EMBODIMENT

In a preferred embodiment, the sodium orthosilicate is made with the following prescription. For 1 gallon of silicate, 12.7 grams of Si rock and 38.10 grams of Si powder are added to the stainless-steel reaction. For present purposes a commercial pressure cooker is used; however, the pressure relief valve is intentionally left open to allow the $H_2$ to escape. Care should be taken to have good ventilation to prevent $H_2$ building up. Next 1 gallon of water is added to the reaction vessel. Tap water can be used, but it leads to a hydroxide precipitate with water hardness, $Mg^{++}$ and $Ca^{++}$. Distilled water is preferred. The water with Si is then heated to about 150-160 F. Once at temperature 340.19 grams of dry NaOH is quickly added and the cover is secured. The reaction as mentioned is exothermic so the vessel quickly heats to about 180 F. The temperature on the vessel is set for 180 F and the mixture is allowed to react at 180 F for 2 hours. After the reaction is completed, the temperature is turned off and the vessel is allowed to cool until the temperature reaches about 100-110 F at which point the liquid is then filtered. Standard coffee filters work fine to filter out the very small amount of solids present leaving a very clear colorless silicate liquid. This reaction can also be done with KOH.

After the orthosilicate solution has been filtered it is diluted 4:1 and then 1-2 grams of the trichloro-s-triazinetrione is added and allowed to dissolve. This takes several minutes and good mixing. At this time the silicate solution is ready for application.

This chlorinated orthosilicate solution is a non-toxic and water-based solution produced from the mixing of the orthosilicate with an additive that is accepted by the EPA as a good mold killer. This chlorinated orthosilicate solution can be applied directly to any surface to kill mold within minutes of application. Due to the dilute nature of the chlorinated orthosilicate it does not stain or affect the appearance of the surface to which it is applied. It provides an easy method for treating surfaces and eliminating mold. A suitable application method is to use a sprayer or fogger.

This ability of the chlorinated orthosilicate solution to kill mold lies in its proprietary formulation which is based on a combination of soluble orthosilicates and the disinfectant, trichloro-s-triazinetrione. It should be acknowledged that most chlorinated disinfectants can also be effective. The chlorinated orthosilicate solution, once applied to the surface, e.g., in the form of a fog or spray, penetrates the wood structure creating a microscopic layer of amorphous silicate glass that locks the disinfectant into the subsurface.

Treating Cement

The alumino-silicates have unique properties that strengthen silicate-based products, e.g., concrete. This is accomplished through its ability to form very strong bonds with the lime (CaO, calcium oxide) in the cement. Since the alumino-silicate is water soluble, it can either be used during the mixing of the cement or as a wash to fill in cracks and fissures that occur as the cement sets. The key to its success lies in its molecular formula which is based on a tetrahedral orthosilicate-aluminate dimer that has a very high electron potential compared to other additives. This large potential gives it the improved bonding properties over other cement additives. It works either as an additive used in conjunction with the cement binder for hydraulic cements (e.g., Portland cement) or as a repair solution added to small and medium sized cracks in existing concrete structures.

Cement basically is a binder and is the basis for concrete, a building material used worldwide due to its strength and durability. However, not all cement and, hence, concrete is the same. Cements used in construction usually are inorganic based often consisting of lime or calcium silicate compounds. They are characterized as being either hydraulic or non-hydraulic, depending upon its ability to set in the presence of water. The present invention focuses on hydraulic cement (such as Portland cement) which hardens when water is added. Two components in Portland cement are Belite which is 2 $CaO*SiO_2$ and Alite which is 3 $CaO*SiO_2$. The silicates are responsible for the mechanical properties of the cement. In cement the CaO content is about 60-65% while the silicate content is more like 15-25%. Once water is added to the cement, it starts to set, and a complex series of hydration chemical reactions begin. The constituents that make up the cement begin to hydrate and then solidify. It is the interlocking of the hydrates that gives cement its strength. During this curing process it is important to maintain the appropriate moisture content in order for the chemical reaction to complete. If the cements dry out during curing, the resulting product can be significantly weakened.

The silicates typically used in cements are alkaline based $SiO_2^{2-}$. With the addition of an alumino-silicate, a more effective and more versatile silicate-based cement results. This is based on alkaline $SiO_4^{4-}$ and $AlO_4^{4}$-aluminate that form a dimer, which provides the potential for a much stronger chemical bond in the cured concrete making the concrete much stronger and durable. In addition to being added as a straight additive for concrete, the alumino-silicate dimer can be used to repair damaged and cracked concrete. By adding it to the cracked concrete, being water-based it will flow deep into the crack and will react with the CaO present to form a very strong bond. In fact, when used on concrete that was not prepared with the $SiO_4^{4-}$ based orthosilicate, the repaired concrete will be stronger than the surrounding concrete structure.

Samples were prepared by an independent laboratory without any additive (BASF MasterGlenium 7500 Full-Range water reducing admixture, BASF© by BASF SE Societas Euopaea Georgia, Ludwigshafen am Rhein, Federal Republic of Germany 67056) and with the disclosed orthosilicate additives, namely, different amounts of alumino-orthosilicate. Testing also was performed by an outside independent laboratory. The data in FIG. 2 demonstrate the increase in tensile strength with the addition of the orthosilicate additive.

Treating Wood

With orthosilicate treatment of wood, the soluble orthosilicate penetrates deep into the wood's cellular structure to create a microscopic layer of silicates (silicates have been also described as liquid glass) that provide a barrier to prevent infestations and decay and provides some fire resistance. When the orthosilicates are combined with borate compounds, the treatment process infuses the orthosilicate-borate mixture into the wood and combines the binding and barrier capabilities of silicates with the protection against termites, mold, and dry rot of borates. The water soluble orthosilicates can be applied directly to any wood surface either in a spray or in a pressure treatment process.

Both silicates and borates have been used in wood treatment, however two things make the present process different and unique. First, the silicates used in other processes rely on a metasilicate, $SiO_2^{2-}$ formulation, while the present invention utilizes orthosilicates, $SiO_4^{4-}$. This increased charge helps strengthen the internal bonding within the wood helping it to form a more impenetrable barrier. The second unique feature is the combination of the silicate with the borate. Borates have long been a preferred method of treating wood for consumer applications due to its non-toxic nature. Borates have long been known to protect wood against various termites and ants, roaches, and wood-boring beetles. Borates further aid in preventing dry rot and fungal decay.

When the silicate treatment occurs in freshly cut wood, the silicate can work its way into the cellular structure and combine with sap material to form a harder and more impenetrable barrier. This barrier also is due to its orthosilicate composition that much more resistant to fire.

This fire resistant and fire-retardant surfaces, e.g., treating wood and wood-like materials and rendering them less likely to burn or slowing down the onset of combustion, can be accomplished by directly coating the surface with the liquid and allowing it to dry, thus, creating the fire resistant or retarding barrier; or by adding the orthosilicate to a foaming agent that, when dry, can create a fire retarding or resistant barrier that is longer lasting.

In addition, when manufacturing the alumino-silicates a solid byproduct is formed which is a zeolite-like structure that settles out. Alumino-silicates are made by using the same formulation as orthosilicates, but with the addition of 0.5-2 moles of aluminum metal in the form of powder and/or granules. This zeolite-like material also is extremely fire resistant, due to a melting point>15000. This solid material can be added to paint and other liquids to make a more fire-resistant surface.

Treating Brown Grease and F.O.G.

Water soluble alumino-silicates compounds based on orthosilicates have unique properties that result from its similarity to zeolites. In solution these zeolite-like structures are in effect soluble zeolites and possess similar characteristics, such as filters and catalysts.

The usual problem treating brown grease is the high content of free fatty acids (FFA). These FFA are very similar in chemical structure to monoglycerides, as seen in their chemical structures set forth below, which are the precursor to biodiesel. The properties these soluble zeolites are utilized in converting waste fatty acids in brown grease to a usable ester.

Free Fatty Acid

Monoglyceride

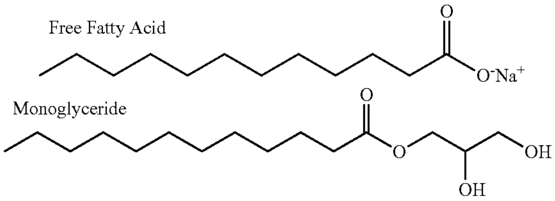

The FFA need to be removed before the remainder of the brown grease, which contains useful oil material, can be processed to make biodiesel. Generally, this removal is accomplished by titrating the FFA weak acid with a base. This wastes the potential of the FFA to be converted into a beneficial by-product, a monoglyceride which can be processed into biodiesel. This can be accomplished by the use of a water-soluble potassium orthosilicate. The mechanism involves hydrogenation from the silicate to the FFA.

FFA on their own are not a strong enough base to pull a hydrogen off a water molecule. However, orthosilicates, being a very strong Lewis base, are strong enough.

This is two-step process where the orthosilicate takes a hydrogen from water:

$$Sio_4^{4-} + H_2O = HSiO_3^{3-} + OH^-$$

This then serves as the source of hydrogen to the FFA.

$$R\text{-}COO^- + HSiO_3^{3-} = R\text{-}COOH + SiO_4^{4-}$$

This also points to a factor that must be considered. An excess of the silicate $SiO_4^{4-}$ will drive the reaction to the left so care must be taken to keep orthosilicate concentration to a minimum.

Separation of Metals from Wastewater

Orthosilicates are very efficient in remediating and removing many dissolved metals in wastewater. A couple of examples are:

$$Ca^{2+} \longrightarrow Ca(OH)_2$$

-continued $$Mg^{2+} \longrightarrow Mg(OH)_2$$

$$Cr^{3+} \longrightarrow Cr(OH)_3$$

$$As_2O_5 \longrightarrow AsO_4$$

$$Ca^{2+} \longrightarrow Ca(OH)_2$$

$$Fe^{2+} \longrightarrow Fe(OH)_2$$

Other dissolved metals in solution, e.g., selenium ions, show increased removal in DAF systems in the presence of $Fe^{+3}$. This is due to the increased coagulation properties of the iron ion. Orthosilicates also can enhance the removal of ions in solution, such as, for example, selenium.

These are just a few. Orthosilicates will precipitate any cation that precipitates in the presence of hydroxide ions. In addition, the zeolite nature of the alumino-silicate adds the ability to ion-exchange and adsorption.

Treatment of Ammonia

Figure 3:
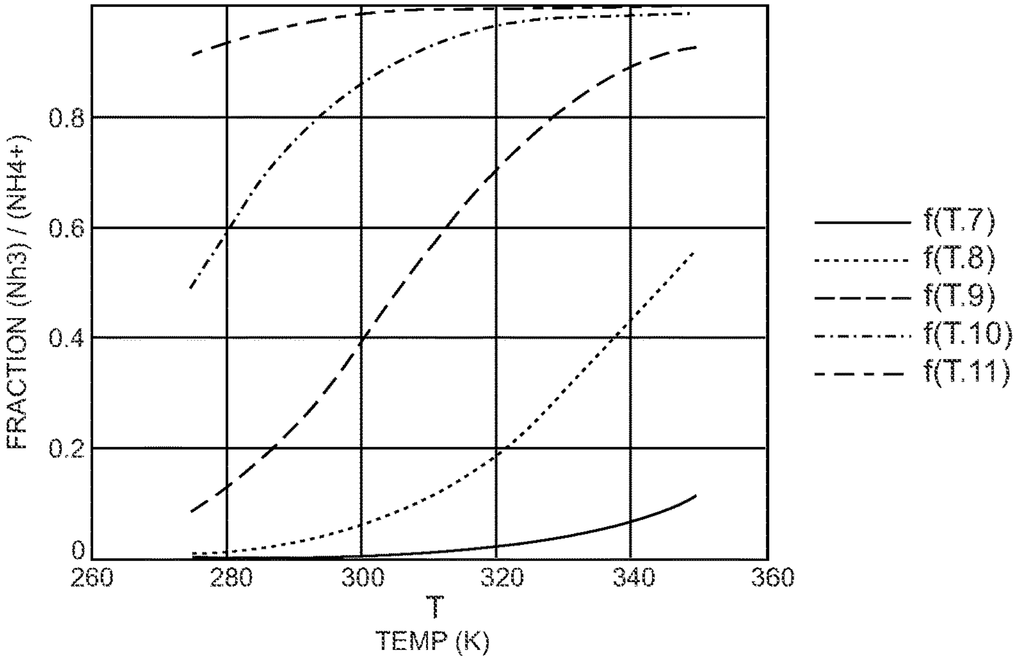
FIG. 3 is a chart showing the $NH_3/NH_4+$ ratio as a function of temperature.

Ammonia in wastewater exists in two forms, $NH_3$ and $NH_4^+$. The ratio is dependent on temperature and pH. The chart in FIG. 3 shows that at 300K and a pH=7 (red line), the ratio is extremely low indicating that most of the ammonia is $NH_4^+$. At a pH=11 (light blue line) the ratio is near 1 meaning most of the ammonia is in the $NH_3$ form. Why is this important? $NH_3$ can be separated from water very easily by heating the water to 40 C where is boils off as a gas that can be separated in a distillation process. While $NH_4^+$ cannot be boiled off. The only way to is to heat to 1000 and boil off the water leaving an ammonia salt. If the pH>11 it will be all $NH_3$.

Another property of the alumino-silicates is that they are essentially soluble zeolites capable of removing ammonium ($NH_4^+$). In wastewater ammonia is very toxic for fish and in higher concentration ammonia can be lethal. In swimming pools, ammonium ions are brought in the water by swimmers. It often reacts with the free chlorine to form chloramines. They are irritating to the eyes and skin.

Zeolites remove ammonium ions by means of ion-exchange and, at higher concentration, adsorption. The ammonium ions present in the wastewater are exchanged for sodium ions that are present in the alumino-silicate.

Tanneries

Orthosilicates have use in tanneries as a replacement for CaO which is used in the removing a hair from hides. There is an added benefit in remediating trivalent $Cr^{+3}$ salts.

Today, 80-90% of leathers in the world are tanned by chrome tanning. Chrome tanning uses a solution of chemicals, acids, and salts (including chromium sulfate) to tan the hide. It is a very quick process, taking about a day to produce a piece of tanned leather. Alumino-silicates are essentially a soluble zeolite material which can replace chrome tanning.

Agriculture for Treatment of Mites

Orthosilicates help in the treatment of plants for mites in two ways: 1) the orthosilicates are an excellent source of silicon for plant stem growth providing a hardened barrier [njaes.rutgers.edu/fs1278/] and 2) the orthosilicates, which are sometimes referred to as liquid glass, provide a costing on the leaves and stalks of the plants creating an exterior barrier to the mites.

Agriculture for Potassium & Silicate Nutrients

Silicon is known to be beneficial for plant growth but, while silicon is very abundant in soil, it is generally unavailable to plants since it exists as insoluble $SiO_2$. Microbes can convert $SiO_2$ into (mono)silicic acid which can be utilized by plants, however, this process is slow.

With water soluble potassium orthosilicates, the silicon is already in the useable form and with potassium it provides an addition form of nutrient.

Humate Processing

The present disclosure relates to methods and compositions for extracting water-soluble humates (humic acid and fulvic acid) using soluble silicates (in particular orthosilicates and other similar silicate structures based on sodium, potassium, calcium, and other mono and divalent cations). Since this disclosure focuses on agricultural applications, the discussion will focus solely on potassium orthosilicate.

The silicate used in this disclosure is the alkaline based $SiO_4^{4-}$ which is a strong Lewis base and represents a more effective method for extracting base-soluble humic and fulvic acids from humate material. In the past a common method used for extracting humic and fulvic acid molecules from humus material has been a simple acid-base extraction wherein the humus material is first contacted with an alkali-water solution with a pH>10-11 to solubilize the humic acid and fulvic acid molecules, thus allowing separation via filtration of the insoluble humin molecules, followed by acidifying the solution to a pH<1-2 in order to precipitate out the humic acid molecules thus allowing separation of the two acids. The humic acid can be added to water and redissolved by raising the pH to 5.5-6.5. The fulvic acid solution should also have its pH raised to the same level.

In present separation methods, hydrogen bonding complicates the separation, both the separation of the two acids from the humin material and the separation of the two acids form one another. Both these separations are not complete. Both these two steps are not 100% complete, usually 40-50%. In both steps, hydrogen bonding, that occurs between the two acids or the individual acids and the humin material, holds them together keeping them from fully separating. Hydrogen bonding is a weak van der Waals attractive force and occurs primarily occurs between H atoms and O atoms and is strong enough to hold them together. To better separate the two acids with present technology, increased temperature and mechanical vibration are applied over many hours and this only results in a separation of 60-70%.

Orthosilicates provide a more versatile method for the initial base-soluble separation of the two acids from the humin due to its high negative charge which disrupts the hydrogen bonding thereby allowing for a more efficient separation once the pH is lowered. Utilizing orthosilicates in the initial step, separation around 90% can be realized.

$H_2S$ Scavenging

Hydrogen Sulfide ($H_2S$) is a gas commonly found during the drilling and production of crude oil and natural gas, as well as in wastewater treatment facilities and sewers. The gas is produced as a result of the microbial breakdown of organic materials in the absence of oxygen. It is colorless, flammable, poisonous, and corrosive.

$H_2S$ is one of the leading causes of gas inhalation deaths in the workplace, having accounted for dozens of fatalities since 2001 alone. $H_2S$ also is highly corrosive, costing oil and gas producers and refineries millions of dollars annually in damages to equipment and pipelines.

Orthosilicates manufactured with CuO or Aluminum have unique properties to provide not only a strong base that neutralizes the weak $H_2S$ acid. A copper orthosilicate product is non-toxic and can be used down-hole or at the surface.

Copper silicates are produced using the formulation of orthosilicates with the addition of 0.5-2 moles of CuO powder or granules.

When used in formation, orthosilicates readily penetrate deep into the micro-fissures and neutralizes the $H_2S$ in the interspatial pores and eliminating or minimizing the $H_2S$ that comes to the surface. It is recommended that for $H_2S$ well treatment an initial dosage which is based on the ppm level of $H_2S$ is injected into the well and is followed by a constant drip system to maintain the $H_2S$ neutralization.

The key to the neutralization is based on the strong alkaline properties of the copper orthosilicate product and is shown chemically below:

$$H_2S + Na_4SiO_4 = Na_2S + Na_2H_2SiO_4.$$

The $Na_2S$ remains in a safe state as long as the pH remains high. $Na_2S$ is eventually removed completely thereby eliminating any undesired back reaction to $H_2S$ by alkylation with organic halide compounds to form a thioether:

$$Na_2S + RX = R_2S + 2NaX,$$

where RX is an organic halide.

Phase Separation: Treating Drill Cuttings

Orthosilicates have been shown to be an effective phase separator that can remove organic compounds (e.g., diesel) from inorganic material (e.g., dirt and sand). This is accomplished by the unique properties of the orthosilicate to break the attractive forces that hold these two together. These van Der Waals forces (hydrogen bonding) are not chemical bonds, but they strong attractive forces which can bind tightly the organic molecule, diesel in the case, to the inorganic silicate structure in the dirt or sand. Since the orthosilicate has a very high negative electrical charge density, which effective disrupts these hydrogen bonds, it can disrupt these attractive forces without added heat.

After treatment with the orthosilicate, which is highly water soluble, the solid material free of hydrocarbons drops out of solution while the hydrocarbons rise to the top.

Figure 4A:
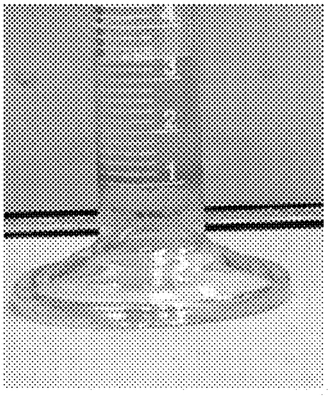
FIGS. 4A and 4B shows the experimental results of adding orthosilicate to diesel to separate inorganic material (i.e. dirt and sand)
Figure 4B:
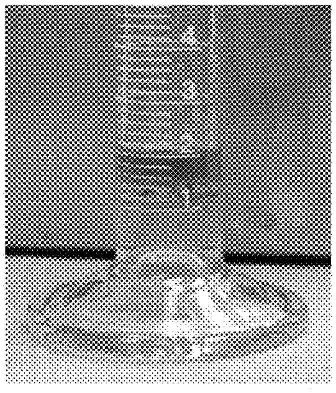

This is shown in FIGS. 4A and 4B. After running a retort, which is just an analytical tool to measure the amount of water and liquid hydrocarbons in a solid sample, on the untreated drill cutting solids, an approximate 100 mL sample of drill cuttings was washed in an approximate 100 mL of orthosilicate solution that was diluted with water to 3-5%. This was mixed for 20 min with a blender on the low setting. After 20 min the sample was filtered then dried with a vacuum filter system and the solids were retorted again. The results are shown in FIGS. 4A and 4B.

This was mixed for 20 min with a blender on the low setting. After 20 min the sample was filtered then dried with a vacuum filter system and the solids were retorted again. The results are shown in FIGS. 4A and 4B.

FIG. 4A (left) shows the before sample of drill cuttings which are about 10% water and 24% hydrocarbon. The treated sample in FIG. 4B (right) is 14% water (most likely increased due the washing with water/orthosilicates) and 8% hydrocarbon. This represents cleaning drill cuttings to a level of 92% hydrocarbon free.

Phase Separation; Well Enhancement and Stabilization

The oil and gas industry is currently experiencing something unprecedented, wells are getting shut in because of storage and pipeline limitations, not to mention the price of oil. Operators are having to make a choice on shutting wells in, knowing that when capacity is freed up and they decide to open the wells back up there is possibility the well will not flow. The cost to workover a well to get it to flow again has a range of $55K to $112K, depending on the condition of the well and the length of time it was shut in. That cost does not include the potential of needing to refracture the well. These decisions are not taken lightly in corporate boardrooms, it is sometimes a decision that allows the company to survive or go bankrupt.

Wells that are shut in have paraffin/asphaltene deposits build up that may contain resins, silt, gums, salt crystals, scale, sand, and clay. Iron oxides will start to adhere to downhole equipment. That buildup reduces the well's ability to flow, thus causing remediation work on the wells that is costly as discussed prior. The unknown is what the buildup is doing to the formation itself, it binds to the well bore, potential sealing the perforations on the casing string. $H_2S$ can also be present in the well which will cause corrosion to equipment, not to mention the toxic and deadly gas.

Orthosilicates can mitigate paraffin, iron oxide and, as discussed above, $H_2S$ buildup. There are several unique ways orthosilicates can provide a benefit to shut in oil and gas wells all of which are enhanced by orthosilicates ability to coat surfaces making it hard for paraffins or iron oxide to build up.

Orthosilicates do several things downhole that are beneficial to shut in wells. First, if paraffins are present, adding them will allow these heavier (paraffin wax) hydrocarbons to separate from the lighter hydrocarbons preventing them from building up. Second, if $H_2S$ is present, it is scavenged. Third, the higher pH of the orthosilicates will cause iron and the hardness metals, calcium and magnesium, to precipitate out. Finally and fifth, orthosilicates, because of their high ionic charge per molecule, help 'unravel' long chain hydrocarbons, making them less 'sticky', thus reducing friction and allowing them to flow easier. All of these can and do lower the cost value of the crude.

Phase Separation; Crude Oil Metals Removal

While trace metals present in crude oil make up less than 1% the total composition, metals such as vanadium and nickel which can be present in amounts up to 2000 ppm for vanadium ($VO^{2+}$) and up to 200 ppm for nickel ($Ni^{2+}$), pose a significant risk to plant equipment during the refining process. Vanadium and Nickel generally are present as metalloporphyrin complexes and these porphyrins have been linked to increased emulsification. At levels in excess of about 15 ppm, there is a higher propensity for forming emulsions which can result in the crude becoming more viscous and expand in volume making recovery more difficult ("Crude Oil Vanadium and Nickel Content Can Predict Emulsification Tendency", G. P. Canevari and R. J Fiocco, International Oil Spill Conference, 1997).

Orthosilicates have unique properties that disrupt weak forces that hold the nickel and vanadium in the porphyrin structure. This is a result of the very high electron potential compared to other additives. Once mixed with crude oil, the orthosilicate readily disrupts the bonding that keeps the metalloporphyrin in place, removing them to the aqueous layer and easily removed.

In the table below the results of tests crude oil are shown. After treating with an orthosilicate, there was an approximate reduction for both vanadium and nickel of 83%. Analysis was conducted at the University of Houston.

| | Vanadium | | Nickel | |
|---|---|---|---|---|
| | Before Treatment (μg/g) | After Treatment (μg/g) | Before Treatment (μg/g) | After Treatment (μg/g) |
| Crude Sample | 178.6 | 30.6 | 63.8 | 10.9 |

EXAMPLES

The following examples are included to demonstrate advantageous embodiments of the invention and should not be construed as limiting. It should be appreciated by those of skill in the art that the techniques disclosed in the examples which follow represent techniques discovered during development to function well in the practice of the invention; and, thus, can be considered to constitute advantageous modes for its practice.

Example 1

As an example, to create 500 mL of the orthosilicate solution, 500 ml of water was placed into stainless reaction vessel, 30, of FIG. 7. Vessel 30 is an 8' diameter stainless steel reaction vessel that is 12' tall with a capacity of 1,200 gallons and fitted with a motor, 32, for rotating a mixer, 34, housed within the vessel. Vessel 30 additionally was a double jacketed vessel with a steam inlet, 36, manhole, 38, and meter sensor 40. In this embodiment distilled water was used. Next, approximately 1.68 g of Si rock and 5.04 g of Si powder were added to the water. These amounts result in a mixture of 75% powder and 25% rock. All ratios are possible. 100% rock takes a much longer time at the elevated temperature, 2-4 hours, while 100% powder is extremely reactive once the NaOH is added and the reaction time is much reduced, <1 hour. After the dry silicon is added to the water, the mixture is mixed gently to ensure that the silicon powder is well dispersed in the water. The temperature then was raised to about 150 F. Then, 45.0 g of NaOH was added to the water and Si mixture. The reaction is exothermic and increased the heat of the water immediately to about 180 F. Next, the solution was maintained at 180 F and allowed to react for 2 hours.

After reacting for 2 hours, all of the silicon was consumed, and the reaction was deemed completed. This was determined by visual inspection of the reaction vessel, noting that there was no longer any silicon ore floating at the top of the liquid mixture or solid pieces on the bottom of the reaction vessel. During the reaction, the silicon can be seen as a gray foam on the top of the liquid. Upon completion, the gray foam had disappeared.

The liquid orthosilicate solution was allowed to cool to about 100 F at which time it was filtered into a clean vessel to remove any unreacted silicon ore. After filtration, the liquid was further cooled to room temperature. Once the solution has reached room temperature, the specific gravity of the final product was measured to be approximately 1.1-1.3 and the pH was approximately 13.5.

Example 2

Mold is a naturally occurring fungus. Tests were performed using a black mold that was prepared in an Agar medium, as shown in the left petri dish in FIG. 4. The left image shows an image of the mold before treatment. The middle image shows the same sample after treating with a chlorinated orthosilicate solution which was made by diluting the formulation from Example 1 by 4 and then adding 1-2 g of TST (trichloro-s-triazinetrione). The appearance of spores in the Agar is not indicative of whether or not the spores are killed. To determine if the mold spores had been killed, a sample from the treated Petri dish (middle) was taken after 24 hours and used to try and regrow the mold in a fresh Agar sample. The results are shown in the right image after 48 hrs. This clearly shows that there were no living mold spores in the center Petri dish 24 hours after treating it with chlorinated orthosilicate solution.

Example 3

Figure 5A:
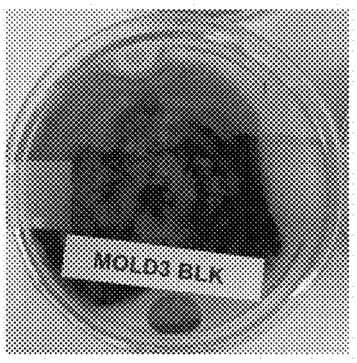
FIGS. 5A, 5B, and 5C show the experimental test results for remediation of black mold.
Figure 5B:
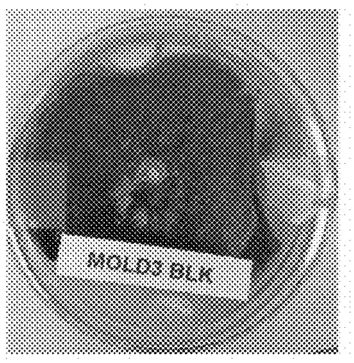
Figure 5C:
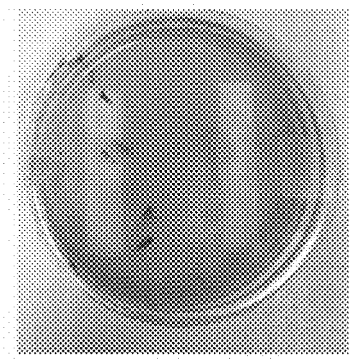
Figure 6A:
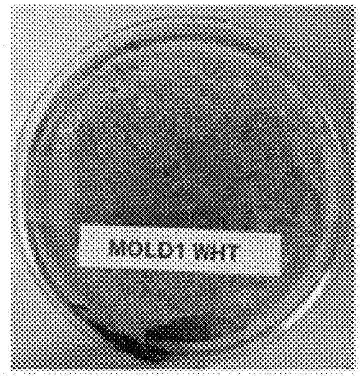
FIGS. 6A, 6B, and 6C show the experimental test results for remediation of white mold.
Figure 6B:
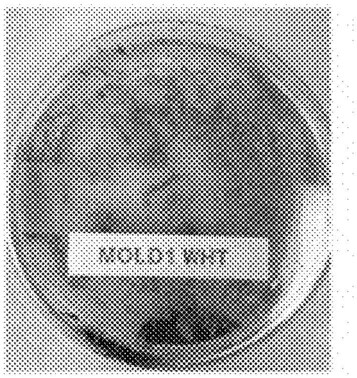
Figure 6C:
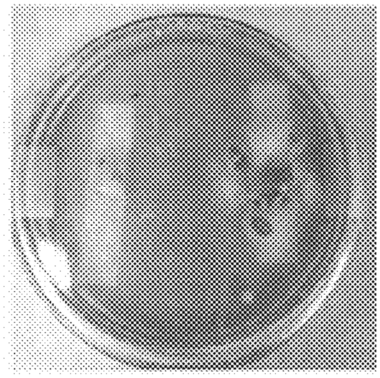

Another test was performed in the manner described in connection with Example 2, but with white mold. FIG. 5 shows the test results. Again, no new while mold could be grown from a sample from the middle Petri dish in fresh Agar (right most image).

Example 4

In order to demonstrate the ability of the disclosed orthosilicate product to provide fire retardancy to wood, pieces of plywood with and without the orthosilicate product were subjected to an open flame in accordance with ASTM E84. The Flame-spread Index of the untreated plywood was a C rating (greater than 90 FSI) and Smoke Developed Index 60 or greater. With the orthosilicate product applied to the plywood, the Flame-Spread Index rated at 25, which is an A rating (highest rating possible) and Smoke Developed Index to 25. The recorded test results follow:

ASTM E84

Test Results

Flame Spread Index: 25

Smoke Developed Index: 25

Specimen Data

| Test | Results |
|---|---|
| Time to Ignition (sec) | 12 |
| Time to Max FS (sec) | 597 |
| Maximum FS (feet) | 14.4 |
| Time to 980° F. (sec) | Never reached |
| Time to End of Tunnel (sec) | Never reached |
| Max Temperature (° F.) | 796 |
| Time to Max Temperature (sec) | 600 |
| Total Fuel Burned (cubic feet) | 45.71 |
| FS*Time Area (ft*min) | 45.6 |
| Smoke Area (% A*min) | 18.8 |
| Unrounded FSI | 23.5 |

Calibration Data

Time to Ignition of Last Red Oak: 35.0

Red Oak Smoke Area (% A*min): 76.2

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

The invention claimed is:

1. A method for making an orthosilicate solution, which comprises the steps of:

(a) first, adding pure elemental silicon particles and water to a pressure reaction vessel comprising a pressure relief valve, wherein the silicon particles are added to the pressure reaction vessel in two size types comprising: (1) 0 to 10% rock having a size up to 2 to 3 centimeters, and (2) 90% to 100% fine powder with sizes ranging from 100 mesh to at least two millimeters;

(b) subsequently adding a molar excess of alkali caustic to the pressure reaction vessel containing the silicon particles to initiate a chemical reaction, wherein rate of addition of alkali caustic is 5% to 10% of a total weight amount of substances in the reaction pressure vessel per 1 to 5 minutes;

(c) closing the pressure reaction vessel upon completion of the addition of alkali caustic to the pressure reaction vessel and allowing the temperature within the pressure reaction vessel to rise as a result of the chemical reaction without the application of external heat to a temperature ranging from 160° F. to 190° F.;

(d) controlling and maintaining the pressure in the pressure reaction vessel to be below 50 pounds per square inch (psi) through use of the pressure release valve to allow hydrogen gas ($H_2$) and water vapor to escape;

(e) controlling and maintaining the temperature in the pressure reaction vessel to not exceed about 190° F. over a period of time that is four hours or less while an aqueous orthosilicate solution is formed, wherein all of the silicon within the pressure reaction vessel is reacted to form the aqueous orthosilicate solution; and, (f) cooling the formed aqueous orthosilicate solution for its recovery.

2. The method of claim 1, wherein the pressure in the pressure reaction vessel is controlled and maintained to be below 40 pounds per square inch (psi) through use of the pressure release valve to allow hydrogen gas ($H_2$) and water vapor to escape.

3. The method of claim 2, wherein the formed aqueous orthosilicate solution has a pH of 13 or greater and a specific gravity of greater than 1.3.

4. The method of claim 1, wherein the formed aqueous orthosilicate solution is filtered via a filter capable of removing particles ranging in size from 1 micron to above 10 microns.

5. The method of claim 1, wherein the formed aqueous orthosilicate solution is diluted with an equal volume of water.

6. The method of claim 2, wherein the alkali caustic comprises NaOH, KOH, $Ca(OH)_2$, BeO, MgQ, SrO or BaO.

7. The method of claim 2, wherein the water comprises distilled water or low TDS water.

8. The method of claim 2, wherein a chlorinated additive is added to the recovered formed aqueous orthosilicate solution.

* * * * *